(12) United States Patent
Flores et al.

(10) Patent No.: US 9,221,106 B2
(45) Date of Patent: Dec. 29, 2015

(54) DEVICE AND METHOD FOR MACHINING A CYLINDER BORE BY MEANS OF A GEOMETRICALLY DEFINED CUTTER AND A GEOMETRICALLY UNDEFINED CUTTER

(75) Inventors: Gerhard Flores, Osfildern (DE); Erwin Baumgartner, Ostfildern (DE); Frank Hummel, Stuttgart (DE); Michael Rach, Ostfildern (DE)

(73) Assignee: Gehring Technologies GmbH, Ostfildern (DE)

( * ) Notice: Subject to any disclaimer, the term of this patent is extended or adjusted under 35 U.S.C. 154(b) by 553 days.

(21) Appl. No.: 13/697,364

(22) PCT Filed: May 11, 2011

(86) PCT No.: PCT/EP2011/057600
§ 371 (c)(1),
(2), (4) Date: Nov. 11, 2012

(87) PCT Pub. No.: WO2011/141505
PCT Pub. Date: Nov. 17, 2011

(65) Prior Publication Data
US 2013/0058730 A1 Mar. 7, 2013

(30) Foreign Application Priority Data
May 11, 2010 (DE) .......... 10 2010 020 931

(51) Int. Cl.
| B23B 41/12 | (2006.01) |
| B23B 29/034 | (2006.01) |
| B24B 33/02 | (2006.01) |
| B24B 33/08 | (2006.01) |

(52) U.S. Cl.
CPC ............ *B23B 41/12* (2013.01); *B23B 29/03446* (2013.01); *B23B 29/03489* (2013.01); *B24B 33/02* (2013.01); *B24B 33/083* (2013.01); *Y10T 408/34* (2015.01); *Y10T 408/348* (2015.01)

(58) Field of Classification Search
CPC ...... B24B 33/027; B24B 33/02; B24B 33/00; B24B 33/08; B24B 33/105; B23B 29/034; B23B 29/03; B23B 41/12; B23B 33/022; B23B 33/027; B23B 41/16; Y10T 408/34; Y10T 408/348
See application file for complete search history.

(56) References Cited

U.S. PATENT DOCUMENTS

| 4,463,490 A | 8/1984 | Saito et al. |
| 5,269,103 A | 12/1993 | Nagel et al. |
| 2010/0197199 A1 | 8/2010 | Flores et al. |
| 2010/0210190 A1 | 8/2010 | Walter et al. |

FOREIGN PATENT DOCUMENTS

| DE | 1 929 347 | 4/1971 |
| DE | 19542892 A1 * | 5/1997 |
| DE | 103 59 347 B3 | 4/2005 |
| DE | 10 2009 033 528 A1 | 11/2012 |
| EP | 0 046 806 B1 | 3/1982 |
| GB | 2 450 445 A | 12/2008 |
| JP | 55138054 U * | 10/1980 |

(Continued)

*Primary Examiner* — Daniel Howell
(74) *Attorney, Agent, or Firm* — Gudrun E. Huckett

(57) ABSTRACT

The invention relates to a device (1) for the combined precision turning and honing of a cylindrical borehole (35). The device (1) according to the invention can comprise either only honing stones (29) which can be fed or also cutters (7) that can be fed during machining.

7 Claims, 5 Drawing Sheets

(56) References Cited

FOREIGN PATENT DOCUMENTS

| JP | 56089416 A | * | 7/1981 |
| JP | 61030343 A | * | 2/1986 |
| JP | 03066561 A | * | 3/1991 |
| JP | 2001353655 A | * | 12/2001 |
| JP | 2007-237375 A | | 9/2007 |
| JP | 2007-253292 A | | 10/2007 |
| JP | 2007-313619 A | | 12/2007 |
| JP | 2009208160 A | * | 9/2009 |
| WO | 81/02404 | | 9/1981 |

* cited by examiner

DEVICE AND METHOD FOR MACHINING A CYLINDER BORE BY MEANS OF A GEOMETRICALLY DEFINED CUTTER AND A GEOMETRICALLY UNDEFINED CUTTER

BACKGROUND OF THE INVENTION

The invention concerns a device and a method for machining a cylindrical bore, preferably a cylinder bore of an internal combustion engine.

The device for machining a cylindrical bore, preferably a cylinder bore of an internal combustion engine, comprises a base member, a first machining tool with at least one geometrically defined cutter and a second machining tool with at least one geometrically undefined cutter, as disclosed, for example, in DE 103 59 347 B3. In this device, a fine boring tool and a honing tool are integrated into the base member wherein the fine boring tool is arranged at an end face of the base member and produces the bore with the desired dimension in a first machining step. Subsequently, when the device is moved farther into the cylinder bore, the honing stones of the honing tool are being employed and the surface is honed to have the desired functional roughness. Because of the fixed correlation and arrangement of the two tools, it is ensured that with one clamping action the fine boring action as well as the honing action are realized and thus the excess material required for the honing step can be minimized. Moreover, the nonproductive time periods for changing the tool or for reclamping the tool are eliminated. As a whole, a shortened machining time is achieved in this way.

However, this combination tool can only be used when it can be moved to a sufficient depth into the workpiece because the fine boring tool is arranged in front of the honing tool in axial direction. Also, the rigidity of the precision turning tool is reduced due to the long configuration which has a negative effect on the machining precision and the performance.

Moreover, it is also known to provide bevel cutters at a honing tool above the honing stones. The bevel cutters that have a geometrically defined cutting edge serve for providing a bevel at the cylinder bore after completion of the honing process.

EP 0046806 B1 discloses a combined fine boring and honing tool in which the cutters and the honing stones are designed to be feedable. A disadvantage of the type of feed action disclosed in this document is the obtainable precision of the feed action. Also, the contact forces existing between the honing stones and the workpiece cannot be acquired.

A basic machine for use with the device according to the invention is disclosed in DE 10 2007 045 619 as a flexible machining apparatus with various machining units for honing and/or fine boring. Reference is being had to the disclosure of this application.

The invention has the object to provide a device that enables various machining operations and machining cuts on cylindrical bores with one clamping action so that the productivity is increased, the quality is improved, and, by means of the machine tool, very different customer demands can be realized in a flexible manner and without complex conversions.

This object is solved according to the invention in connection with a device for machining a cylindrical bore, wherein the device has a base member, a machining tool with at least one geometrically defined cutter, and a machining tool with at least one geometrically undefined cutter, in that both machining tools are moved by separate pressure rods.

Feeding of the two machining tools independent of each other by means of pressure rods in accordance with the invention makes it possible to realize the feed action with very great precision and to increase as a result of this the precision with which the cylinder diameter can be produced.

SUMMARY OF THE INVENTION

This object is solved according to the invention also for a device for machining cylindrical bores, wherein the device has a base member, a machining tool with at least one geometrically defined cutter, in that the machining tool can be moved by a pressure rod.

Feeding by means of pressure-actuated pressure rods is particularly suitable for the device with two machining tools as well as for a device according to the invention with one machining tool in order to monitor the contact force between one or both tools and the cylinder bore to be machined and employ it for process control. In this way, an improvement of the machining results is also achieved and at the same time a reduction of the machining time and a reduced discard rate.

In order to be able to convert the axial feed movement of the first and/or the second pressure rod into a radial feed movement of the first and/or the second machining tool, the first and the second pressure rods have at least one feed cone. This feed cone effects together with the feed slants at the machining tools a deflection of the axial feed movement of the pressure rods into a radial feed movement of the machining tools. Accordingly, the transmission of the feed movement from the pressure rods onto the machining tools is realized in a very precise and play-free way. Wear is very minimal because through the feed slant and the corresponding feed cone a relatively large contact surface between the feed cone and the machining tool is provided.

In order for the machining tools to also return in radial direction inwardly upon retraction of the pressure rods, the machining tools are secured with form fit and/or frictionally, preferably by spring loading, in contact with the at least one feed cone of the pressure rods. In this way, it is also ensured that no play between feeding pressure rod and machining tool is produced.

Moreover, a load cell within the pressure rods themselves or in a coupling rod arranged upstream can be provided in order to be able to detect precisely and in real time the contact force between the machining tool and the bore wall in radial direction. The knowledge of the contact force between the machining tool and the bore wall is an important parameter by means of which machining can be controlled and the machining result can be optimized. Moreover, for example, cutter breakage can be recognized and machining can be stopped.

Also, monitoring of the machining process in real time requiring only acceptable expenditure is possible when the feeding force is transmitted as a pressure force by means of the pressure rods into the device. In case of a transmission by traction, this is much more complex and requires a significantly higher construction and apparatus expenditure.

In a preferred embodiment of the invention, the machining tool is configured with at least one geometrically undefined cutter as a honing tool, comprising several honing stones that are distributed about the circumference, while the tool is configured with at least one geometrically defined cutter for precision turning, fine boring or for beveling. The tool is preferably designed for fine boring or precision turning in the situation when the cylinder bore to be machined must be improved, prior to honing, with regard to its position, axial direction and/or its geometry before the actual honing process is carried out.

When the device according to the invention is provided with a tool for beveling, the cutters of this beveling tool can be provided at the end face of the base member as well as at the end of the base member that is facing the machine tool. It is then possible to produce a bevel simultaneously at both ends of a cylinder bore. This can be advantageous in particular when the cylinder bore has been provided, for example, by plasma coating, with a wear protection layer and this wear protection layer, in order to prevent chipping, must be beveled at both ends.

A further improvement of the machining result, but also a further reduction of the machining time, is achieved in that in the base member at least one measuring nozzle for pneumatic detection of the diameter of the cylinder bore to be machined is provided. In this way, it is possible to detect during machining, in particular during fine boring and during the honing process, the diameter of the cylinder bore and, in this way, to achieve, with constantly low dispersion, the desired nominal value of the bore diameter within a very short time.

In an advantageous embodiment of the invention, this at least one measuring nozzle is arranged in axial direction in overlap with the honing stones. This means that the bore diameter can be detected directly at the location where the cylinder bore is honed. Accordingly, in real time and locally at high resolution the bore diameter can be detected. Based on these measuring results, slight conicity of the cylinder bore can be compensated and/or the diameter can be controlled in a targeted fashion at different locations of the cylinder bore. The measuring nozzles signalize indirectly by means of the bore diameter detected by them whether the cutting inserts are worn.

The advantages of the device according to the invention can be realized completely in particular when the feed action of the first pressure rod and/or the second pressure rod provided within the machine tool is realized electromechanically. In this case, it is possible to move with a step motor and a threaded spindle the pressure rods with the desired precision and repetition accuracy in axial direction relative to the base member so that, by means of the deflection with the feed cone and the feed slants, the desired radial feed action of the machining tools is achieved.

In order for the machining result to be further improved and the machining time to be further reduced, it is particularly preferred when the feed action is realized by force control. When by means of suitable sensors in the first pressure rod and/or the second pressure rod the contact forces of the machining tool at the cylinder bore is detected during machining, the process control can be further optimized which is then expressed in correspondingly improved machining results. Moreover, interruptions such as, for example, a broken-off cutter, can be realized immediately so that the machine can be switched off and consequential damage can be prevented. Moreover, the downtime periods are reduced which leads to a further improvement of the economic viability of the device according to the invention.

BRIEF DESCRIPTION OF THE DRAWINGS

Further advantages and advantageous embodiments of the invention can be taken from the following drawing, its description and the claims. All features that are disclosed in the drawing, the description, and the claims may be individually, as well as in any combination with each other, important to the invention.

It is shown in

DESCRIPTION OF EMBODIMENTS

Figure 1:
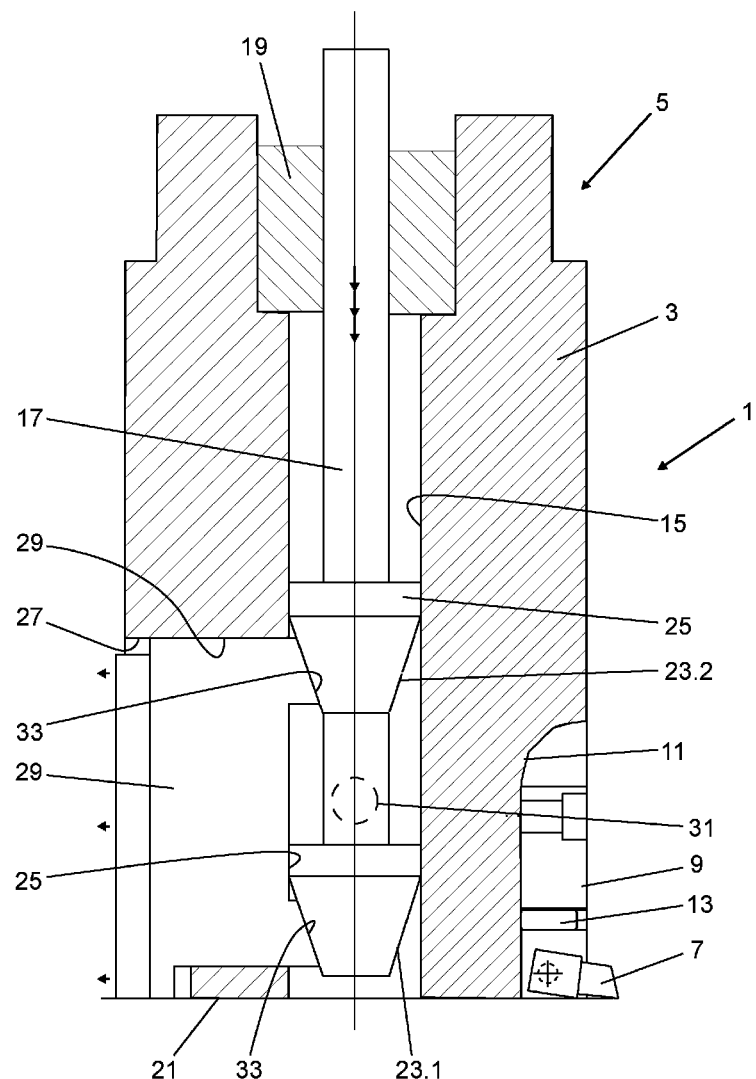
FIG. 1 a first embodiment of a device according to the invention with a feed action of the honing stones and fixedly adjusted cutter for fine boring.

In FIG. 1 a longitudinal section of a first embodiment of a device 1 according to the invention is shown. The device 1 comprises a substantially rotation-symmetrical base member 1. At the upper end in FIG. 1, the device 1 is received rigidly in a tool receptacle, not shown, of a machine tool. In order to ensure radial true run and axial true run of the base member 3, for this purpose on the base member 3 a projection 5 for central and axial positioning is provided which interacts with a matching receptacle on the machine tool. In the present case, the base member is rigidly connected with the spindle of the machine tool, not illustrated.

At the bottom end of the base member 3 shown in FIG. 1, a cutting insert 7 is visible that is secured by a screw by means of a cutting insert support 9 in a pocket 11 of the base member 3. This cutter implement, comprising the cutting insert 7 and the cutting insert support 9, cannot be moved during machining. Instead, by means of the set screw 13 that interacts with a corresponding inner thread in the cutting insert support 9, the cutting insert support 9 and together with it the cutting insert 7 can be moved in radial direction relative to the base member 3. In this way, a preadjustment of the cutting insert 7 is possible that is preferably realized outside of the machine tool at a work station that is especially designed for this purpose. In this way, it is possible to precisely adjust the bore diameter of the bore to be machined.

The base member 3 has a central bore 15 in which a first pressure rod 17 is guided. At the upper end of the base member 3, the first pressure rod 17 is guided in a bearing bushing 19 so as to be axially slidable. At the bottom end in FIG. 1, i.e., in the vicinity of the end face 21 of the base member 3 the first pressure rod 17 has two feed cones 23.

The feed cones 23 and 23 pass into a cylindrical guide section 25. The guide sections 25 are matched such to the diameter of the central bore 15 that in this way a radial bearing action of the first pressure rod 17 is realized and the pressure rod 17 at the same time is slidable axially relative to the base member 3.

Opposite the cutting insert 7, a port 27 is provided on the base member 3 and a honing stone 29 is guided therein so as to be radially slidable. The honing stone 29 has two feed slants 33 that interact with the feed cones 23 of the first pressure rod 17. Since the honing stone 29 interacts by means of two feed slants 33 with the two feed cones 23, it is ensured that the honing stone 29 is always precisely fed in radial direction outwardly and does not "tilt". Spring elements that secure the honing stone 29 in contact at the feed cones 23 are not illustrated for reasons of simplification.

The feed movement of the first pressure rod 17 is illustrated in FIG. 1 by arrows (no reference characters). This produces a radial feed action of the honing stone 29. Because the feeding force is introduced as a pressure force by means of the first pressure rod 17 into the device 1 according to the invention, it is also possible to provide in the first pressure rod 17 or upstream in the drive of the machine tool, not illustrated, a force measuring device. In this way, it is possible to detect in real time the contact forces that are acting between the honing stone 29 and the cylinder bore to be machined and employ them during machining for controlling the machining process.

Of course, it is understood that, for example, several cutting inserts 7 and honing stones 29 are provided so as to be distributed about the circumference within the base member 3. For example, two or three cutting inserts 7 or three or five honing stones 29 can be arranged and distributed about the circumference within the base member. The cutting inserts 7 can be arranged staggered relative to each other in axial direction on the base member 3. In this way, it is achieved that the cylinder bore is processed sequentially by the different cutting inserts 7.

In order to detect the diameter of the cylinder bore to be machined during machining and to be able to control machining as a function of the diameter of the cylinder bore 35, in the base member 3 one or several measuring nozzles 31 are arranged. The measuring nozzles 31 are arranged according to the invention in axial direction approximately at the level of the honing stones 29 so that during long stroke honing as well as during a possible short stroke honing the diameter of the cylinder bore 35 produced by the honing stones 29 is detected during machining and can be used for controlling the machining process.

Figure 2:
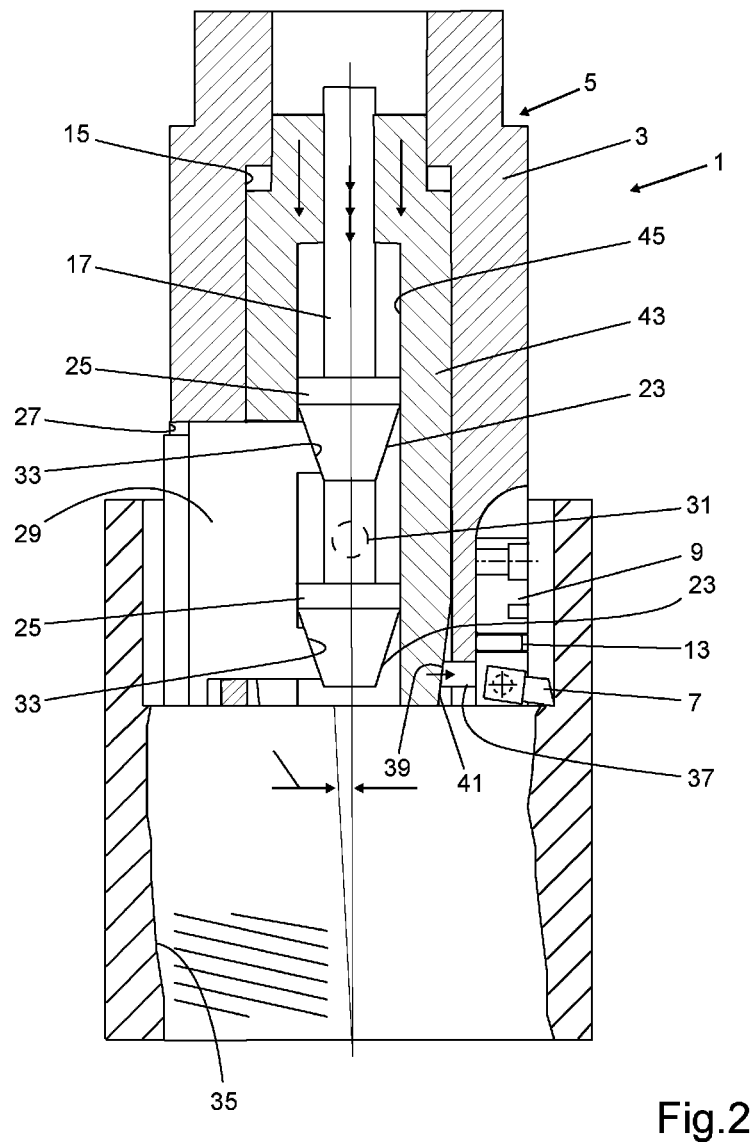
FIG. 2 a second embodiment of a device according to the invention in which the honing stones as well as the cutters of the fine boring tool are radially feedable.

In FIGS. 1 and 2, the measuring nozzle 31 is indicated only by a circle in a dashed line because the measuring nozzle 31 is arranged behind the first pressure rod 17. The supply of the measuring nozzle 31 with compressed air within the base member 3 is not illustrated.

In any case, the measuring nozzle 31 is arranged above the cutting inserts 7 in the base member 3 and enables in this way during the machining process a detection of the bore diameter.

By positioning the measuring nozzle 31 in axial direction at the level of the honing stones 29, a detection of the bore diameter can be realized also for short stroke honing (FIG. 5) within the area of the cylinder bore that is machined by short stroke honing and can also be taken into account correspondingly in the machine control.

Not illustrated are coolant supplies with which the cutting inserts 7 but also the honing stones 29 are supplied with cooling and lubricating agents.

In FIG. 2, a second embodiment of a device according to the invention is illustrated. Same components are identified with the same reference characters and what has been said with regard to the other Figures applies likewise. In FIG. 2, the device 1 is illustrated during precision turning of a rough pre-machined cylinder bore 35. The rigid receptacle of the base member 3 in the machine tool, not illustrated, enables correction of the position as well as of the direction of the cylinder bore 35 by precision turning. This is indicated in FIG. 2 by an angle between the axis of rotation of the device 1 and the central axis of the rough pre-machined cylinder bore 35. The correction of the position of the cylinder bore 35 by precision turning becomes apparent clearly in FIG. 2 in that on the left side the cutting insert 7 removes significantly less material than on the right side. In this way, a correction of the position of the cylinder bore 35 is achieved.

In the embodiment illustrated in FIG. 2, the cutting insert 7 or the cutting insert support 9 is radially feedable. This is realized in that radially in inward direction at the cutting insert support 9 a nose 37 with a feed slant 39 is formed. The feed slant 39 interacts with a feed cone 41 of a second pressure rod 43. The second pressure rod 43 has an inner bore 45 that serves for radial guiding of the first pressure rod 17. Moreover, the second pressure rod 43 takes on the task of a bearing bushing 19 (see FIG. 1) at the upper end shown in FIG. 2.

The second pressure rod 43, in turn, is supported on the central bore 15 of the base member 3. In this embodiment, the cutting insert 7 as well as the honing stone 29 are feedable separate from each other in radial direction during machining.

Since the pressure rods 17 and 43 with their feed cones 23 and 41 are radially symmetrical, basically any number of honing stones 29 and cutting inserts 7 can be fed. Of course, there are technological boundary conditions that are to be observed and, moreover, there must be sufficient room of course within the base member 3. Since the second pressure rod 43 also transmits the feed movement by means of a pressure force, indicated also by arrows in FIG. 2, onto the cutting inserts 7, it is also possible here to detect the feeding force by means of a load cell (not illustrated) and to employ it for controlling or monitoring the precision turning process.

During machining of the cylinder bore 35 illustrated in FIG. 2 by precision turning, the honing stones 29 are retracted so that they are not in contact with the cylinder bore 35 that is precision-turned. As soon as the cylinder bore 35 has been precision-turned, the cutting insert 7 by retracting the second pressure rod 43 can be moved again radially in inward direction and, at the same time, the honing stones 29 by actuation of the first pressure rod 17 are fed in the radial direction outwardly. As soon as an appreciable feeding force exists as a result of the honing stones 29 contacting the precision-turned cylinder bore 35, a force-controlled and/or travel-controlled governing action of the feed movement can be realized so that optimal machining results are achieved in conjunction with reduced machining time.

A force-controlled feed movement is to be understood as a step-wise feed action of the honing stones 29 where the contact force during machining is monitored in real time. Only when the contact force between honing stones 29 and cylinder bore 35 has dropped below a predetermined threshold value, a further feed action is performed.

With this force-controlled feed movement it is ensured that, on the one hand, always the technologically optimized contact force exists. A the same time, it is ensured that no impermissibly high contact forces will occur because, for example, wear of the grinding body in the honing stone 29 or clogging of the honing stone 29 by metal particles can be taken into consideration.

During precision turning, the feeding force or the radial force, the radial force acting between the cutting insert 7 and the cylinder bore 35, can also be used for controlling and monitoring the precision turning process. For example, it is possible to detect whether the cutting insert 7 is becoming blunt based on the contact force continuously increasing.

When the contact force suddenly decreases, this is an indication for a broken cutting insert 7 and can be used for stopping machining and for issuing a malfunction message.

Figure 3:
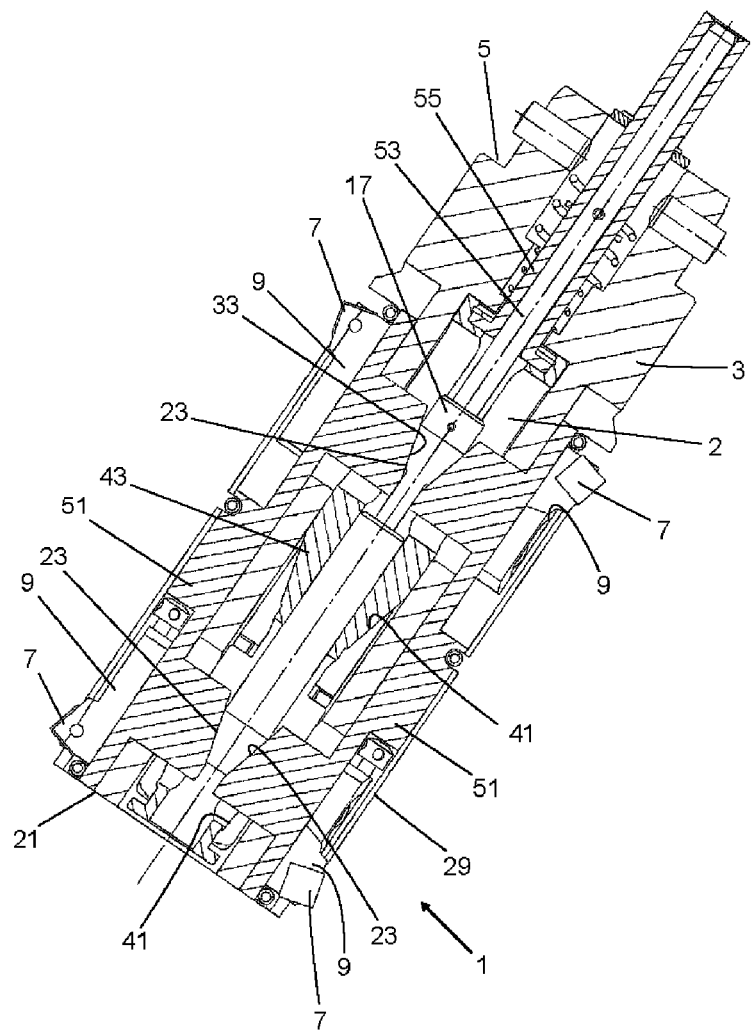
FIG. 3 a third embodiment of a device according to the invention with radially feedable honing stones and for beveling a cylinder bore.

In FIG. 3, a third embodiment of a device according to the invention is illustrated. In this embodiment, in axial direction before and behind the honing stones 29 cutting inserts 7 are arranged that serve for beveling the cylinder bore 35 at its upper end and its bottom end.

The cutting inserts 7, similar to the embodiments according to FIGS. 1 and 2, are mounted on a cutting insert support 9. In contrast to the afore described embodiments, these cutting insert supports 9 are attached to intermediate members 51 that are arranged so as to be radially movable on the base member 3. The intermediate members 51 have feed slants 39 that interact with appropriate feed cones 23 of the first pressure rod 17. In this way, it is ensured that the cutting inserts 7 at the end face 21 and at the opposite end of the base member 3 are fed parallel and, in this way, the bevels at the upper end and the bottom end of the cylinder bore 35 are produced simultaneously.

In the illustration according to FIG. 3, the cutting inserts 7 for beveling and the intermediate supports 51 are visible particularly well because they are staggered relative to each other by 180 degrees. Accordingly, the honing stones 29 in this embodiment cannot be seen as well because they are not illustrated directly within the section plane. However, in FIG. 3 to the right at the bottom a honing stone 29 can be seen. This honing stone 29, like the other invisible honing stones, are radially fed by means of the second pressure rod 43 with its feed cones 41 and the feed slants (without reference character) interacting therewith.

By comparing the embodiments according to FIGS. 1 and 2, on the one hand, as well as the embodiment according to FIG. 3, it is apparent that the cutting inserts 7 can be actuated either by the first pressure rod 17 or the second pressure rod 43. Accordingly, the honing stones 29, as needed and according to practical considerations, can be moved either with the first or with the second pressure rod 17, 43.

In the device 1 according to FIG. 3, the base member 3 is not rigidly connected but connected in articulated fashion with the machine tool so that the device according to the invention contacts and aligns itself in the already existing bore 35 by means of the honing stones 29. This is always helpful when the position and axial direction of the bore to be machined are not to be corrected but a uniform material removal is to be achieved on the entire cylinder surface. This is the case, for example, when the cylinder bore has been coated with a wear protection layer and this wear layer now must be machined appropriately by means of honing with respect to geometry, diameter and surface structure in accordance with the requirements of the application. It is then also often required to bevel the upper end and the bottom end of the cylinder bore 35 with the cutting inserts 7 in order to prevent chipping of the wear protection layer at the ends of the cylinder bore 35.

In FIG. 3 at the upper end of the base member 3 it is visible clearly that the pressure rods 17 and 43 are actuated by coupling rods 53 and 55. The coupling rods 53 and 55 belong to the machine tool which drives the device 1 according to the invention.

Figure 4:
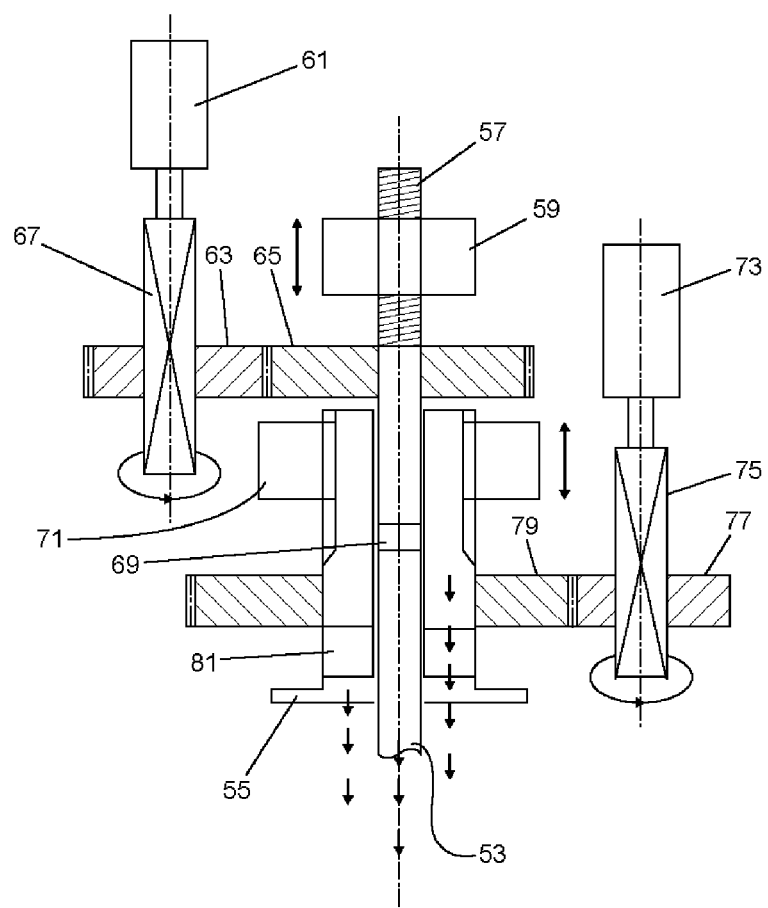
FIG. 4 an electromechanical feed action according to the invention that is preferably force-controlled for the first pressure rod as well as for the second pressure rod of the device according to the invention.

In FIG. 4, a detail of a machine tool according to the invention is shown that illustrates schematically the operation of the electromechanical feed action.

At the upper end of the first coupling rod 53, a thread 57 is provided that interacts with a stationary nut 59. The nut 59 also carries out the oscillating feed movement during honing and also during precision turning. This is indicated by a double arrow adjacent to the nut 59. By means of the receptacle 5 at the devices according to the invention (not illustrated in FIG. 4), this oscillating stroke movement is transmitted also onto the base member 3 of the device according to the invention.

In order to be able to move the coupling rod 53 relative to the base member 3 in axial direction, a first electrical step motor 61 is provided that can rotate by means of two gear wheels 63, 65 the coupling rod 53 in a stepwise fashion relative to the nut 59. In this way, an axial relative movement to the oscillating first nut 59 but also to the base member 3 of the device according to the invention is carried out.

The second gear wheel 65 can be shrunk-fit, for example, onto the first coupling rod 53. This means also that the first gear wheel 63 must also carry out the oscillating stroke movement so that the gear wheels 63 and 65 always mesh with each other.

Accordingly, the first electric motor 61 has a relatively long output shaft 67 with a dihedral section or a different shaft-hub connection that enables axial movement of the first gear wheel 63 relative to the shaft 67 of the first electric motor 61.

Of course, it would be also possible to connect the first gear wheel 63 rigidly with the shaft 67 and to support the second gear wheel 65 stationarily within the machine tool and to design the connection between second gear wheel 65 and first coupling rod 53 in such a way that the first coupling rod 53 in axial direction can move relative to the second gear wheel and, at the same time, a form-fit torque transmission between the second gear wheel 65 and a first coupling rod 53 is enabled. This constitutes essentially a kinematic reversal of the situation illustrated in FIG. 4.

In order for the contact forces, acting between the honing stones 29 and the cylinder bore 35 to be machined, to be detected in real time during machining, the first coupling rod 53 has integrated therein a first force measuring sensor 69 that provides information on the pressure forces acting on the first coupling rod in axial direction. These output signals that are provided by the first force measuring sensor 69 can be used in the machine control for monitoring and/or for controlling the machining process. Accordingly, the drive of the first coupling rod 53 provides an electromechanical force-controlled feed movement of the first coupling rod 53.

The second coupling rod 55 is actuated in a similar fashion. Here, a second nut 71 is provided that also carries out the stroke movement that is provided by the machine tool. A thread of the second coupling rod 55 is screwed into this second nut 71. The second coupling rod 55, in turn, is stepwise rotated, as needed, by a second electric motor 73, with an output shaft 75 as well as a first gear wheel 77 and a second gear wheel 79, in a similar fashion as the first coupling rod 53 in order to be able to provide a feed action to the tools of the device 1 according to the invention that are connected with the second coupling rod 55. Of course, it is also possible here that the first gear wheel 77 is rigidly connected with the shaft 65 of the second electric motor 73 and the relative movement, the oscillating movement of the second coupling rod 55 resulting from the stroke of the nut 79 of the second nut 71 is ensured by an axial movability between the second gear wheel 79 and the second coupling rod 55.

The force measuring sensor 81 is also provided in the second coupling rod and enables detection of the feeding force in real time during machining. Accordingly, an electromechanical force-controlled feed movement of the second coupling rod 55 is possible also.

Figure 5:
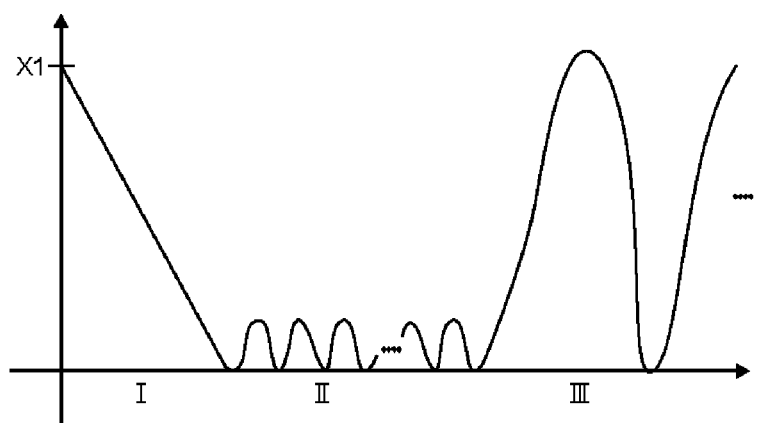
FIG. 5 a machining method according to the invention.

In FIG. 5, a diagram of the sequence of a method according to the invention for machining a cylinder bore 35 with a device according to FIG. 1, for example, is illustrated. In this device 1, the geometrically defined cutter 7 is fixedly adjusted and cannot be moved during machining.

On the abscissa three sequential machining steps I, II, III are plotted. The length of the individual sections depends of course on the boundary conditions of the cylinder bore 35 to be machined. It can be carried out by time control or as a function of the achieved machining result, for example, by continuous diameter monitoring of the cylinder bore by means of the measuring nozzle.

On the Y axis, a longitudinal coordinate X of the bore to be machined is indicated in a standardized form. The coordinate direction X extends parallel to the longitudinal axis of the cylinder bore to be machined. The value X=0 corresponds to the bottom end of the cylinder bore where, for example, the bearing bracket of the crankshaft bearing are arranged.

In the first machining step I, the already existing rough machined cylinder bore 35 is machined by precision turning. In this connection, the device according to the invention is immersed from above, i.e., at X=1, into the cylinder bore 35 and carries out precision turning of the cylinder bore 35 to be machined. As already mentioned, when doing so, a possible positional change of the center of the bore or an axis error can be compensated and the bore diameter is produced to be within very tight tolerances.

In the first machining step I, the device 1 moves from top to bottom within the cylinder bore 35 until the cutting inserts 7 have reached the bottom end of the cylinder bore 35. Now the first machining step is completed.

When now, without carrying out any further provisions, one would continue directly with finish honing (see machining step III), this would have the undesirable result that the tip of the cutting insert would create grooves 7 in the bottom part of the cylinder bore. These grooves are undesirable because these grooves will not disappear completely even after finish or long stroke honing. Moreover, cutting edge chipping at the cutters 7 may happen which is also undesirable.

In order to avoid this, in a second machining step II, short stroke honing (step II) is carried out in the section of the cylinder bore 35 into which the cutter inserts 7 are immersed during the third machining step (finish honing). In this connection, one must take into consideration that, as shown in FIG. 1, the honing stones 29 in axial direction have a longer extension than the cutting inserts 7.

This is taken advantage of in step II. In step II, the diameter in the bottom area of the cylinder bore 35 is expanded such that upon subsequent long stroke honing or finish honing (step III) the rigid cutting inserts 7 no longer cause grooves. The stroke for short stroke honing (step II) is determined such that the honing stones 29 are immersed so far from the bottom into the cylinder bore 35 as the cutter inserts 7 upon subsequent long stroke honing (step III).

In this connection, this short stroke honing in the second machining step II can produce the bore so as to have already the grinding allowance of, for example, 0.01 mm-0.005 mm relative to the final diameter.

When this state has been reached, either as a function of the achieved diameter or with time control, the second machining step II can be terminated and the cylinder bore 35 can be finish honed in the third machining step III.

With this method according to the invention, it is possible even with the device according to the invention with a cutting insert 7 that cannot be fed, to carry out a highly effective and qualitatively excellent machining operation. In devices in which the cutting inserts 7 during machining are feedable, the second machining step II can be eliminated because the cutting inserts 7 after machining can be moved again in radial direction inwardly and, in this way, damage of the cylinder bore during the subsequent machining step III (finish honing) no longer must be taken care of. It is important that the short stroke honing has a stroke that ensures a collision-free axial movement of the cutting inserts 7 upon subsequent long stroke honing. Short stroke honing is therefore performed across a length within which upon subsequent long stroke honing (machining step III) the fixedly adjusted cutting inserts 7 reach their upper stroke reversing point.

What is claimed is:

1. A method for machining a cylindrical bore with a device comprising a first machining tool with at least one geometrically undefined cutter and a second machining tool with at least one geometrically defined cutter, wherein the first machining tool with geometrically undefined cutter during machining of the bore is feedable, the method comprising the steps of:
    in step I, machining the bore by the second machining tool with geometrically defined cutter;
    in step II, machining a section of the bore by short stroke honing with the first machining tool;
    in step III, machining the bore by long stroke honing with the first machining tool.

2. The method according to claim 1, further comprising the step of detecting at least one parameter selected from a diameter of the bore and a contact force of the first and/or the second machining tools in at least one of the steps I, II, and III.

3. The method according to claim 2, further comprising the step of monitoring and controlling machining by employing the at least one parameter.

4. A method for machining a cylindrical bore with a device comprising a first machining tool with at least one geometrically undefined cutter and a second machining tool with at least one geometrically defined cutter, wherein the first machining tool with geometrically undefined cutter and the second machining tool with at least one geometrically defined cutter during machining of the bore are feedable, the method comprising the steps of:
    machining the bore by the second machining tool with geometrically defined cutter;
    subsequently, moving in the first machining tool with at least one geometrically undefined cutter in a radial direction;
    subsequently, machining the bore by long stroke honing with the first machining tool.

5. The method according to claim 4, further comprising the step of detecting at least one parameter selected from a diameter of the bore and a contact force of the first and/or the second machining tools during machining.

6. The method according to claim 5, further comprising the step of monitoring and controlling machining by employing the at least one parameter.

7. The method according to claim 5, further comprising the step of force-controlled or travel-controlled feeding of the first and/or the second machining tools.

* * * * *